United States Patent
Menard et al.

Patent Number: 5,732,966
Date of Patent: Mar. 31, 1998

[54] BRACKET FOR TRAILER WIRING CONNECTOR

[75] Inventors: Dustin Carlos Menard; Derek Swain Menard, both of Gillett, Ark.

[73] Assignee: Menard Manufacturing Company, Gillett, Ark.

[21] Appl. No.: 638,438

[22] Filed: Apr. 26, 1996

[51] Int. Cl.$^6$ ..................................................... B60D 1/62
[52] U.S. Cl. ................................................ 280/422; 439/35
[58] Field of Search ............................... 280/420, 422; 307/10.8; 191/11; 248/71; 439/34, 35

[56] References Cited

U.S. PATENT DOCUMENTS

| | | | |
|---|---|---|---|
| 3,176,257 | 3/1965 | Introvigne | 339/38 |
| 3,482,203 | 12/1969 | Whitright | 339/36 |
| 3,577,115 | 5/1971 | Whitright | 339/36 |
| 3,606,385 | 9/1971 | Johannes | 280/422 |
| 3,908,296 | 9/1975 | Harrison | 40/210 |
| 4,067,635 | 1/1978 | Solberg | 339/119 |
| 4,278,226 | 7/1981 | Horowitz | 248/314 |
| 4,738,641 | 4/1988 | Eversole, Jr. | 439/528 |
| 4,772,220 | 9/1988 | Hallier, Jr. | 439/528 |
| 4,885,524 | 12/1989 | Wilburn | 320/25 |
| 4,940,427 | 7/1990 | Pearson | 439/501 |
| 5,056,698 | 10/1991 | Kozakevich | 224/273 |
| 5,129,828 | 7/1992 | Bass | 439/35 |
| 5,201,484 | 4/1993 | Thoen | 248/71 X |
| 5,255,767 | 10/1993 | Norwood | 191/12.2 |
| 5,288,094 | 2/1994 | Putman | 280/429 |
| 5,308,253 | 5/1994 | Maki | 439/148 |
| 5,380,209 | 1/1995 | Converse, Jr. | 439/34 |
| 5,407,219 | 4/1995 | Chin | 280/422 |
| 5,443,389 | 8/1995 | Hughes | 439/35 |
| 5,611,695 | 3/1997 | Bentley | 439/35 |

*Primary Examiner*—Joseph D. Pape
*Attorney, Agent, or Firm*—Hill, Steadman & Simpson

[57] ABSTRACT

A bracket is provided for mounting an automobile portion of a mateable connector of the type for connecting an automobile's electrical system to operate a trailer's lights, turn signals or brakes. The bracket is configured for installation to a conventional rear license plate assembly for convenient hook-up adjacent a trailer hitch and consists of a base portion and a cantilevered arm portion. The base portion cooperatively mounts with screw holes alignable with standard holes of the rear license plate. The arm portion may extend from the base portion at desired angled orientation with respect to the base portion. An electrical connector portion is securably mounted to the free end of the arm portion, positioning the connector portion for convenient plugging-on of a mated connector portion associated with the trailer's wiring.

19 Claims, 2 Drawing Sheets

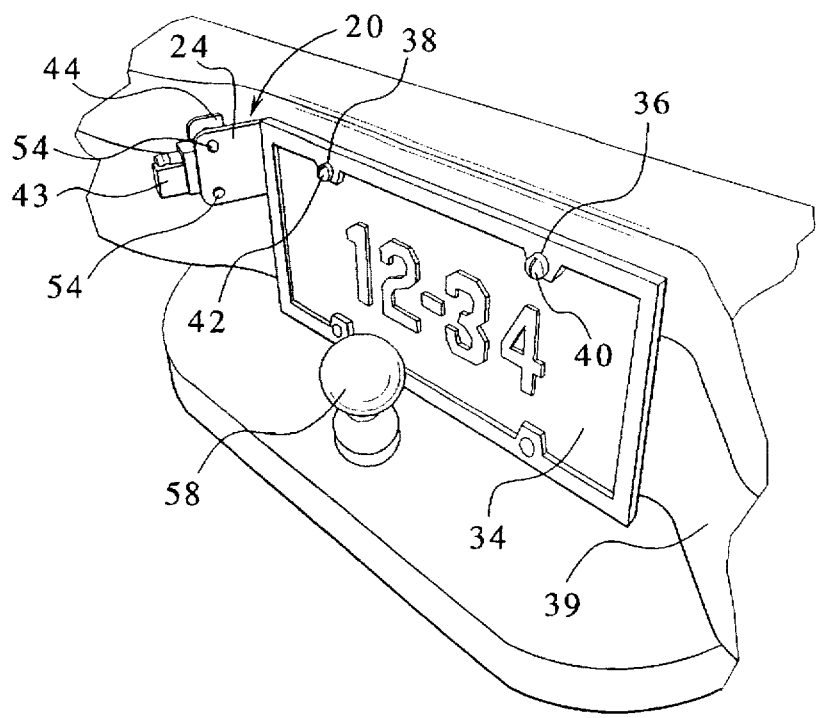
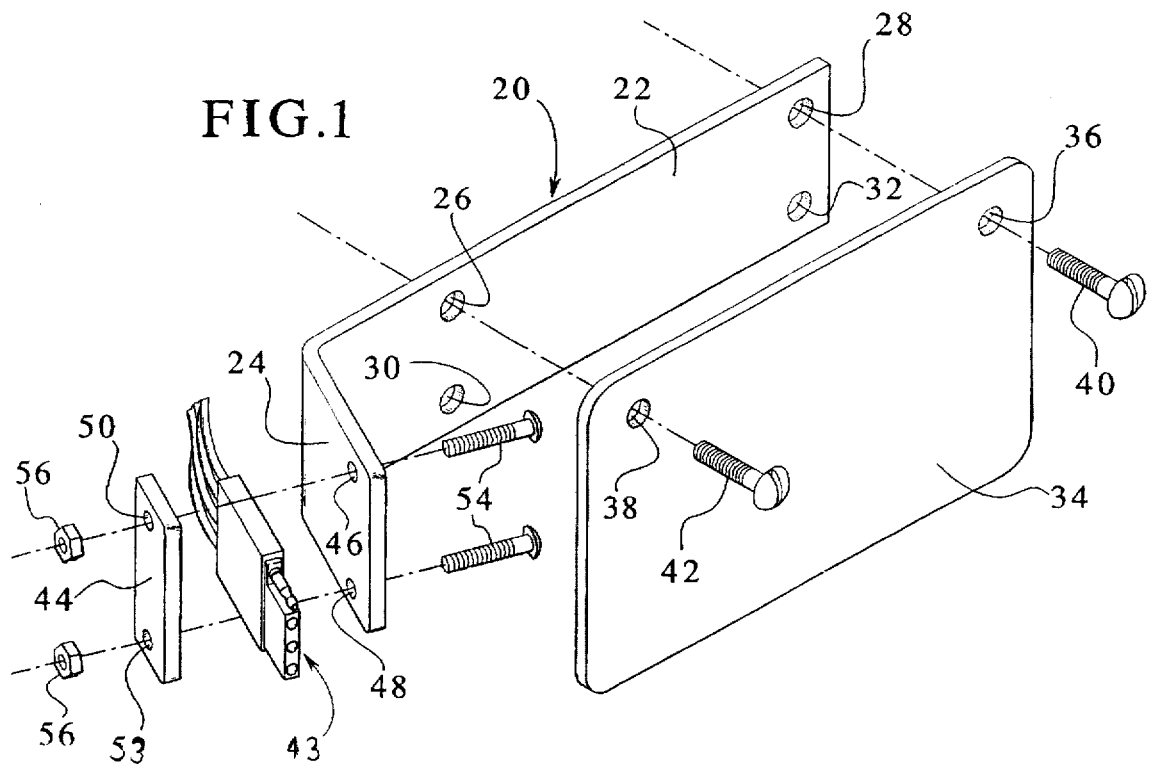

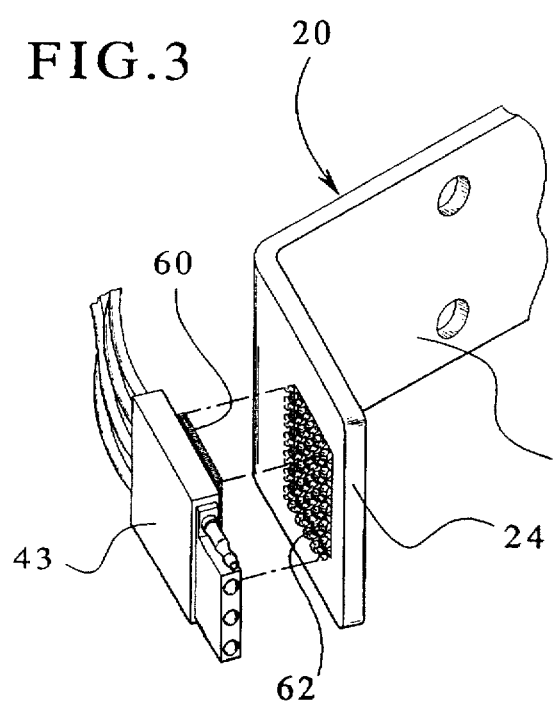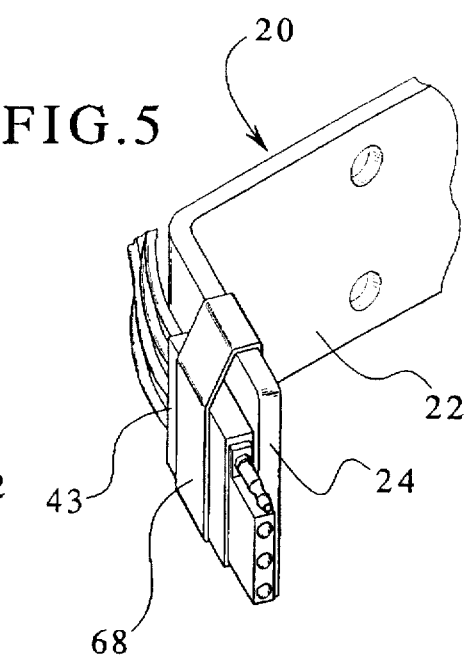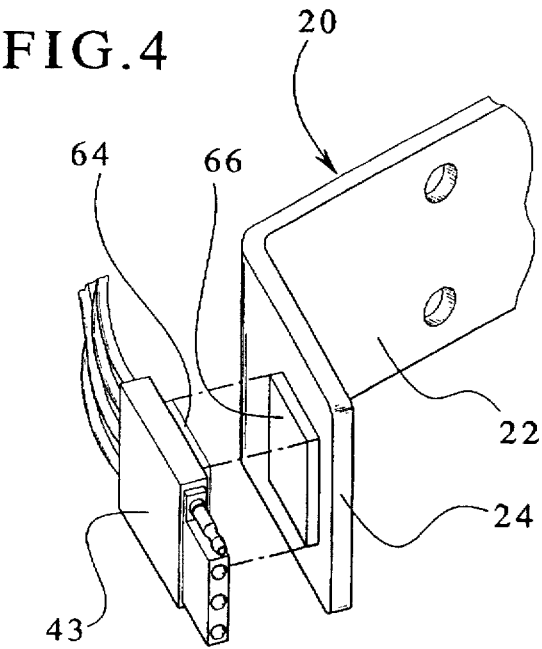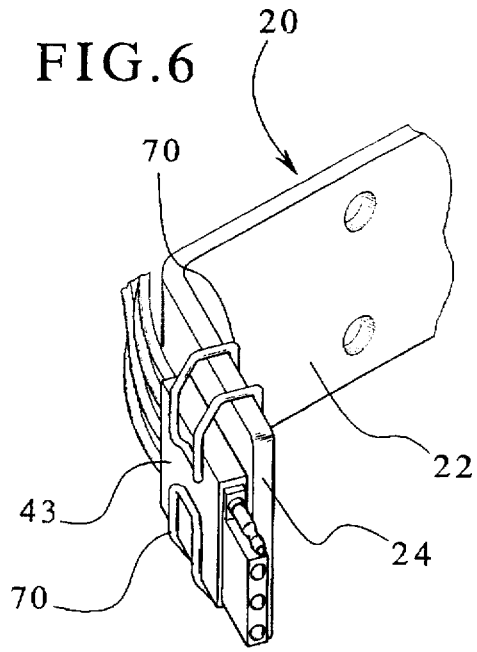

BRACKET FOR TRAILER WIRING CONNECTOR

BACKGROUND OF THE INVENTION

1. Field of the Invention

This invention generally relates to automobile-to-trailer electrical wiring connectors. More particularly, the present invention relates to an automobile mounting bracket for a trailer wiring connector installable with a conventional rear license plate assembly to securably position the connector in the vicinity of an automobile's trailer hitch, providing convenient hook-up with a mateable connector portion associated with the trailer's wiring system.

2. Description of the Prior Art

Cars and trucks are often used to tow trailers, such as campers, boat trailers, or load-carrying trailers for transporting objects. Trailers for street use are typically equipped with running lights, brake lights, turn signals and, sometimes, electric brakes. These features are operable by auxiliary hook-up to the vehicle's wiring system. A two-piece mateable electrical connector is conventionally used to connect the trailer wiring system to the vehicle wiring system upon hitching.

The conventional automobile-to-trailer connector is a plastic-housed plug-and-socket arrangement. When connected carelessly, such a connector may be allowed to swing freely on slack wiring between the vehicle and the trailer. If this happens, the connector might drag along the road or knock around. Damage to insulators or wiring caused by abrasion or impacts may occur which can loosen or break the connector, or short the wiring system. Moreover, even during non-use, an unconnected, but unrestrained, vehicle connector portion may also dangle and experience damage.

Various structures are known for holding a wiring connector in a particular location, e.g., to either the trailer or the vehicle. For example, U.S. Pat. No. 4,940,427 relates to a device for securing a connector portion to the vehicle. However, that device is only for storing the vehicle connector portion when it is disconnected and not in use. Accordingly, the connector may still dangle during operable hook-up to a trailer. Furthermore, that device inconveniently requires a user to remove the connector portion from the device in order to connect and disconnect the mateable trailer connector portion.

U.S. Pat. No. 3,606,385 relates to a special tool box bumper arrangement with a tube-mounted connector portion integrally formed into the bumper adjacent a trailer hitch. Because the connector mount is integral to the bumper, retrofitting a vehicle to this system requires complete replacement of the bumper. Moreover, the mounted connector portion described in that patent is not of the type currently conventional for light-duty auxiliary trailer power.

Therefore, a need exists for new and improved structure for securing a connector portion of an automobile-to-trailer auxiliary wiring system. A securing device preferably is easily installed or retrofitted onto conventional automobiles; It is further desirable that a mounting device for securing a connector portion hold the connector portion in an easily accessible position for mateably connecting to a complementary trailer connector portion.

SUMMARY OF THE INVENTION

An object of the invention is to provide a mounting bracket which is easily installed and universally retrofittable to cars and trucks. To this end, the present invention provides a bracket which is mountable to a conventional rear license plate assembly of a car or truck. This bracket securely holds an electrical connector portion associated with the vehicle's electrical system. The bracket conveniently holds the electrical connector during use and non-use conveniently near a trailer hitch so that a complementary mateable connector associated with a trailer may be easily and conveniently plugged-in and connected for operating trailer lights, etc.

Another object of this invention is to provide aft automobile-to-trailer connector arrangement in which the position of the connectors does not interfere with the hitching mechanism between the vehicle and the trailer and which is easily accessible for installation.

In an embodiment, the mounting bracket has a base portion and a cantilevered arm portion. The base portion of the bracket is mounted to the rear license plate assembly of the vehicle. The base portion may have bolt holes which correspond to the conventional license plate mounting screw locations. The base portion is securable under a conventionally-installed license plate, without special modification or tools, and without blocking the license plate from view. The cantilevered arm portion extends from the base portion away from the license plate assembly. A mounting portion of the cantilevered arm is defined at a free end of the arm. Preferably, the cantilever arm portion is angled relative to the base portion. This positioning allows convenient connector hook-up and does not interfere with the trailer hitch. Furthermore, the angled configuration permits use with a license plate assembly which is recessed into a bumper or body panel.

According to the invention, a portion of the electrical connector, such as a female portion of an automobile-to-trailer plug-and-socket connector, is firmly secured to the mounting portion of the cantilevered arm. In a presently preferred embodiment, a bolted plate squeezes the connector portion against the cantilevered arm in a secured manner.

Additional features and advantages of the present invention are described in, and will be apparent from, the detailed description of the presently preferred embodiments and from the drawings.

BRIEF DESCRIPTION OF THE DRAWINGS

FIG. 1 is an exploded perspective view of the connector mounting bracket and conventional rear license plate.

FIG. 2 is a perspective view of an embodiment of the mounting bracket when assembled and installed with the rear license plate of a vehicle.

FIG. 3 is a fragmentary perspective view of an embodiment of the present invention wherein the connector portion is mountable to the arm portion by hook-and-loop material.

FIG. 4 is a fragmentary perspective view of an embodiment of the present invention wherein the connector portion is mountable to the arm portion by a magnet.

FIG. 5 is a fragmentary perspective view of an embodiment of the present invention wherein the connector portion is mounted to the arm portion by a strap.

FIG. 6 is a fragmentary perspective view of an embodiment of the present invention wherein the connector portion is mounted to the arm portion by a pair of spring clips.

DETAILED DESCRIPTION OF THE PREFERRED EMBODIMENTS

In accordance with the present invention, with reference to the accompanying Figures, wherein like numerals designate like parts, a new and improved trailer connector mounting bracket 20 is shown in FIG. 1. Bracket 20 includes a base portion 22 and a cantilevered arm portion 24. In a preferred embodiment, the base portion 22 has at least two holes 26, 28 or 30, 32. These mounting holes are positioned to align with conventionally-located holes 36, 38 of a standard license plate 34. Although the license plate 34 illustrated is of the shape typically used in North America, the mounting bracket 20 according to the invention may be configured for use with other standard license plate shapes and styles used around the world, which might have different standard screw-hole locations.

The bracket 20 is installable on a vehicle by positioning the mounting bracket 20 under the license plate 34 opposite the outwardly-facing side of the license plate 34, so that the bracket holes 26, 28 or 30, 32 are aligned with the license plate mounting holes 36, 38, and by tightening conventional license plate mounting screws 40, 42 through the holes into threaded members (not shown) provided in the bumper member. The mounting bracket 20 is thereby securely held between the license plate and a panel normally covered by the license plate, such as a bumper 39 (FIG. 2).

As illustrated in FIG. 1, the license plate mounting screws 40, 42 are aligned with the upper set of holes 26, 28 in the base portion 22. The bracket could, however, be mounted in a lower position by..tightening the lower license plate screws through the lower set of holes 30, 32. Also, the bracket may be flipped over so that the arm portion 24 extends from the right side of the license plate 34, instead of from the left, as illustrated. According to a further embodiment, the holes 26, 28 or 30, 32 may be elongated or be slot-shaped (not shown) and have an open end at an edge of the base portion.

An automobile connector portion 43 of an automobile-to-trailer electrical wiring connector is securable to an end of the cantilevered arm portion 24 which defines a mounting portion. Accordingly, in an embodiment, the connector portion 43 is securable between a squeeze plate 44 and the arm portion 24. As shown, the squeeze plate 44 has two holes 50 and 52 at opposite ends. The squeeze plate holes 50, 52 are aligned with holes 46, 48 in the arm portion 24, respectively. A bolt or screw 54 is passed through each of the aligned sets of holes 46, 50 and 48, 52, and is tightened by a nut 56. Embodiments are possible wherein the screws 54 are threaded directly to the squeeze plate or arm portion. In accordance with the invention, other securing means are possible, such as hook-and-loop material, adhesive, a sleeve integral to the mounting bracket 20, a magnet, a spring clip, or any suitable mechanical clamping, squeezing, gripping or securing means.

FIGS. 3–6 illustrate such alternative structures for mounting the connector portion 43 to the arm portion 24. FIG. 3 illustrates an embodiment wherein the connector portion 43 is secured to the arm portion 24 by cooperating patches 60 and 62. As shown, the patch 60 is made of hook-type material and is affixed to the connector portion 43, such as by adhesive. The patch 62, made of loop material, is affixed to the arm portion 24 by adhesive. When the hook patch 60 is pressed against the loop patch 62, the connector portion 43 is secured relative to the arm portion 24. Of course, the hook patch 60 and loop patch 62 could be oppositely arranged.

FIG. 4 illustrates an embodiment of the present invention wherein the connector portion 43 is mounted to the arm portion 24 by a magnet. A magnet 64 is secured to the housing of the connector portion 43, such as by adhesive. If the arm portion 24 is made of an iron-containing alloy, the magnet 64 can hold the connector portion 43 directly against the arm portion 24. If, however, the bracket 20 is not constructed of a magnetically-attractive material, a metal patch 66 made of an iron-containing alloy is securable to the arm portion, such as by adhesive. The metal patch 66 provides a surface against which the magnet 64 is securely attracted. Of course, the magnet 64 and patch 66 could be oppositely arranged, so that the magnet is secured to the arm portion and the metal patch is secured to the connector portion.

FIG. 5 illustrates an embodiment wherein the connector portion 43 is strapped against the arm portion 24 by a strap 68. The strap 68 may be an elastic band, tape, fabric, a metal strip, or some other wound material.

FIG. 6 illustrates an embodiment wherein the connector portion 43 is mounted to the arm portion 24 by one or more spring clips 70. As illustrated, the spring elements 70 are C-shaped wire springs which contact outer surfaces of the connector portion 43 and arm portion 24, biasing those elements together. However, other sizes and shapes of spring clips are possible.

Also, in the embodiment shown, the arm portion 24 extends at an obtuse angle from the base portion 22. This shape permits the mounting bracket 20 to fit on a license plate assembly which is recessed into a bumper, such as shown in FIG. 2, and further positions the connector portion 43 for easy access. Also, because the connector portion is secured near a side of the license plate 34, the connector portion 43 does not interfere with a trailer hitch ball 58. The bracket 20 may also be provided in another shape, as necessary, to facilitate mounting of the connector portion with a particular vehicle. For example, the bracket might be straight, bent at a right angle, or bent at multiple angles in order to conform to a particular body panel or bumper shape surrounding the license plate assembly or even vertically arranged so that the cantilever arm portion is disposed either above or below the license plate on a particular vehicle.

FIG. 2 shows the invention as installed on a vehicle, wherein the base portion 22 has been mounted with the rear license plate assembly of a vehicle. As shown, the conventional connector portion 43 is damped and securely positioned to the cantilever arm 24 by the 'squeeze plate 44 tightened by the squeeze plate screws 54, 56. As illustrated, the connector portion 43 is of a conventional type having mostly female connector sockets and one male plug member. A corresponding mateable connector portion (not shown) associated with a trailer's wiring system, is plugable onto the connector portion 43, so that the trailer's running lights, brake lights, turn signals and/or brakes are operable via the car's or truck's electrical system. It should be noted that a connector portion of any desired configuration may be used as needed for a particular automobile-to-trailer wiring application. The securing means may be adapted to connectors having various shapes.

Preferably, the base portion 22 and the cantilever arm portion 24 are unitarily formed, as shown in FIG. 1. Accordingly, the mounting bracket 20 may be made of metal or plastic which is bent, formed, molded, cast, banded or otherwise constructed.

Various changes and modifications to the presently preferred embodiments will be apparent to those skilled in the art. For example, although the embodiment illustrated includes a releasably-mounted base portion 22, the base portion 22 could be affixed independently of the screws, such as by welding or adhesive bonding to the bumper. Such changes and modifications may be made without departing from the spirit and scope of the present invention and without diminishing its attendant advantages. Therefore, the appended claims are intended to cover such changes and modifications.

What is claimed is:

1. A bracket for mounting an automobile-to-trailer electrical wiring connector to an automobile, the bracket comprising:

a base portion and a cantilevered arm portion, the arm portion having a first end connected to the base portion and an opposed free end spaced from the base portion, the arm portion being disposed at an angled orientation with respect to the base portion;

an electrical connector mounting portion defined at the free end for receiving and positively securing an electrical connector portion in a position accessible for plugging-on of a mated trailer connector portion; and means for securing the base portion to a license plate assembly of a vehicle.

2. The bracket according to claim 1, wherein the means for securing the base portion to the license plate assembly includes two or more holes in the base portion which are correspondingly alignable with standard screw locations of the license plate assembly so that the base portion is securable behind a license plate with conventional license plate screws.

3. The bracket according to claim 1, further comprising:

a squeeze plate arranged at the mounting portion to clamp the connector portion against the arm portion.

4. The bracket according to claim 3, further comprising at least one threaded bolt extending through the squeeze plate and the mounting portion to hold the squeeze plate against the connector portion.

5. The bracket according to claim 1, further comprising:

a pair of cooperating hook-and-loop patches respectively secured to the mounting portion and connector portion.

6. The bracket according to claim 1, further comprising:

a magnet holding the connector portion against the mounting portion.

7. The bracket according to claim 1, further comprising:

a strap disposed around the connector portion and mounting portion.

8. The bracket according to claim 1, further comprising:

at least one spring clip resiliently biasing the connector portion in contact against the mounting portion.

9. The bracket according to claim 1, wherein the base portion and the arm are unitary.

10. The bracket according to claim 1, wherein the bracket is metal.

11. The bracket according to claim 1, wherein the bracket is plastic.

12. The bracket according to claim 1, wherein the bracket is configured so that the arm portion is positioned to avoid interference with a trailer hitch ball.

13. The bracket according to claim 1, wherein the arm portion and the base are disposed at an obtuse angle from each other.

14. An automobile bracket for mounting an electrical power connector, said mounting bracket comprising:

a substantially planar base having at least two holes alignable with corresponding standard holes of a rear license plate so that the substantially planar base is securable under said the rear license plate by screws through said holes;

a cantilevered arm projecting from the substantially planar base to extend away from said license plate; and a squeeze plate securable to the cantilever arm so that at least a portion of the electrical power connector is damped between the squeeze plate and the cantilever arm.

15. The bracket according to claim 14, wherein the arm forms an obtuse angle with the substantially planar base.

16. The bracket according to claim 14, wherein the squeeze plate is securable to the arm by at least one screw extending through the cantilever arm and squeeze plate.

17. The bracket according to claim 14, wherein the holes in the base are configured for selective mounting to either upper or lower holes of the license plate.

18. A method for mounting an automobile-to-trailer wiring connector to a vehicle, the method comprising the steps of:

providing a bracket having a cantilevered arm portion extending from an end of a substantially planar base portion, the base portion having at least one mounting hole;

mounting the bracket under the rear license plate of the vehicle by aligning the at least one mounting hole with a corresponding license plate screw hole; and mounting one part of a mated two-part plug-and-socket connector to the free end of the arm portion.

19. The method according to claim 18, wherein the mounting of the connector part to the cantilever arm includes:

providing a squeeze plate;

positioning the connector part between the squeeze plate and the cantilever arm; and clamping the squeeze plate against the connector part with at least one screw extending through the squeeze plate and arm portion.

* * * * *